(12) United States Patent
Wedelsback

(10) Patent No.: US 9,587,981 B2
(45) Date of Patent: Mar. 7, 2017

(54) SPECTROMETERS COMPRISING SPATIAL LIGHT MODULATORS

(75) Inventor: Haakan Wedelsback, Angelholm (SE)

(73) Assignee: FOSS ANALYTICAL A/B, Hilleroed (DK)

( * ) Notice: Subject to any disclaimer, the term of this patent is extended or adjusted under 35 U.S.C. 154(b) by 0 days.

(21) Appl. No.: 14/415,088

(22) PCT Filed: Jul. 16, 2012

(86) PCT No.: PCT/EP2012/063900
§ 371 (c)(1),
(2), (4) Date: Feb. 13, 2015

(87) PCT Pub. No.: WO2014/012570
PCT Pub. Date: Jan. 23, 2014

(65) Prior Publication Data
US 2015/0177064 A1   Jun. 25, 2015

(51) Int. Cl.
*G01J 1/44* (2006.01)
*G01J 3/02* (2006.01)
*G01J 3/04* (2006.01)
*G01J 3/10* (2006.01)

(52) U.S. Cl.
CPC .......... *G01J 3/0229* (2013.01); *G01J 3/027* (2013.01); *G01J 3/04* (2013.01); *G01J 3/10* (2013.01)

(58) Field of Classification Search
CPC .. G01J 3/0229; G01J 3/027; G01J 3/06; G01J 3/28; G01J 1/44
See application file for complete search history.

(56) References Cited

U.S. PATENT DOCUMENTS

| | | | | |
|---|---|---|---|---|
| 5,504,575 A | * | 4/1996 | Stafford | G01J 3/28 356/328 |
| 6,128,078 A | | 10/2000 | Fateley | |
| 6,392,748 B1 | | 5/2002 | Fateley | |
| 7,652,765 B1 | * | 1/2010 | Geshwind | G01J 3/02 356/330 |

OTHER PUBLICATIONS

International Search Report PCT/ISA/210 for International Application No. PCT/EP2012/063900 Dated Nov. 13, 2012.

* cited by examiner

*Primary Examiner* — Tarifur Chowdhury
*Assistant Examiner* — Jamil Ahmed
(74) *Attorney, Agent, or Firm* — Harness, Dickey & Pierce, PLC

(57) ABSTRACT

A spectrometer may include: an input configured to receive optical radiation; a dispersion element configured to disperse by wavelength the optical radiation passing from the input; an output; and/or a spatial light modulator (SLM) configured to receive a wavelength region of the optical radiation dispersed by the dispersion element, and configured to selectively direct wavelength portions of the received wavelength region to the output. The input may be configured to provide a plurality of entrance field stops by which the dispersion element is, in use, illuminated. Each of the plurality of entrance field stops may cooperate with the dispersion element to generate a different dispersed wavelength region at the SLM.

19 Claims, 3 Drawing Sheets

SPECTROMETERS COMPRISING SPATIAL LIGHT MODULATORS

CROSS-REFERENCE TO RELATED APPLICATIONS

This application is a national phase under 35 U.S.C. §371 of PCT International Application No. PCT/EP2012/063900 which has an International filing date of Jul. 16, 2012.

BACKGROUND

1. Field

The present invention relates to a spectrometer comprising a spatial light modulator (SLM) such as a digital micro-mirror device (DMD).

2. Description of Related Art

Spectrometers are employed in the analysis of wavelength dependent intensity variations of optical radiation, from the ultraviolet to the infrared spectral regions. Typically, a dispersion element such as a prism or a diffraction grating is employed in these spectrometers to disperse incident optical radiation by wavelength in a preferred dispersion plane. An input is provided comprising an entrance field stop, typically an entrance slit, acting as a bandpass limiter for the optical radiation which is to be incident on the dispersion element. This field stop essentially determines the optical resolution and throughput of the spectrometer.

As is well known, the dispersion element may be moved, typically rotated about an axis perpendicular to the dispersion plane, in order to sweep individual wavelengths of a wavelength region of interest of the dispersed optical radiation sequentially over an output which may be a detector, an exit slit or other optical radiation collector. This places significant precision requirements on the mechanical system employed to effect the movement of the, often heavy, dispersion element and such systems are known to be susceptible to external mechanical disturbances and wear.

One known solution to this problem is to provide spectrometer having a static dispersion element and incorporating a detector array of separately addressable elements in place of the single detector typically employed in conjunction with the movable dispersion element. The stationary dispersion element operates to disperse a wavelength region of interest which is here distributed by wavelength across the elements of the detector array in the dispersion plane. However, signal detection requires sophisticated and relatively expensive electronics and the detector arrays are themselves relatively expensive, particularly for detector arrays suitable for the detection of wavelengths in the infrared region.

Furthermore, spectrometers which comprise an SLM are known from for example U.S. Pat. No. 5,504,575 which is assigned to Texas Instruments Incorporated, address both the problems of mechanical movement of the dispersion element and the use of a detector array. According to the known SLM spectrometer there is provided an input by means of which is illuminated a stationary prism, grating or other type of wavelength dispersion element, typically having a preferred dispersion plane. An SLM, such as a DMD, a magneto-optic modulator or a liquid crystal device, is provided to receive, distributed by wavelength across its active surface, an entire wavelength region of interest having been dispersed in the preferred dispersion plane by the dispersion element. By activating (or deactivating) small portions (i.e. cells) of its active surface the SLM is operable to selectively direct a wavelength portion of the received wavelength region of interest to the output. Through appropriate activation and deactivation of the individual cells or groups of cells (typically groups of cells in a direction perpendicular to the dispersion plane i.e. columns) different narrow wavelength bands of the received wavelength region of interest can be provided to the output. In this manner the entire wavelength region of interest may be swept sequentially across the output and a single detector element may be employed.

SUMMARY

A problem with the known SLM spectrometer is that the SLM element must be sufficiently large so that the entire wavelength region of interest in the dispersed spectrum is incident on its active surface without compromising resolution or light efficiency. Particularly when using a DMD device as the SLM there is a trend towards the introduction of smaller, lower cost devices, which trend renders the larger devices obsolete or, at least, more expensive. The use of a plurality of SLM elements disposed so as to together receive the entire wavelength region of interest is also cost prohibitive.

It is an aim of the present invention to at least alleviate an aforementioned problem associated with the SLM spectrometer. Accordingly, a first aspect of the present invention provides a spectrometer comprising an input for optical radiation; a dispersion element for dispersing incident optical radiation from the input by wavelength; an output and a spatial light modulator (SLM), such as a DMD, disposed to receive a wavelength region of optical radiation which is dispersed by the dispersion element and being operable to selectively direct wavelength portions of the received wavelength region for receipt at the output; wherein the input is adapted to provide a plurality of entrance field stops by means of which the dispersion element is illuminated in use and each of which is disposed to generate a different, possibly overlapping, wavelength region at the SLM. The number and location of the entrance field stops may be selected such that their associated different wavelength regions together provide a wavelength region of interest at the SLM which is larger than any of the individual wavelength regions. By employing multiple entrance field stops it is possible to multiplex the plurality of different spectral regions at the same SLM and thereby have a small SLM behave as a larger one. Thus an extended wavelength spectrum at the output may be generated through a suitable combination of the individual wavelength regions without the need to increase the physical size of the SLM.

In one embodiment there is provided a plurality of optical radiation sources, each for illuminating the dispersion element through an associated different entrance aperture, acting as an entrance field stop. Each source of the plurality is configured to generate optical radiation having a wavelength range substantially that of the wavelength region at the SLM generated by its associated aperture. In this manner, the spectrometer may be made more energy efficient since substantially all of the energy produced by the source is provided at the SLM.

BRIEF DESCRIPTION OF THE DRAWINGS

These and other advantages of the invention will be better understood from a consideration of the following description of exemplary embodiments with reference to the figures in the accompanying drawings in which.

DETAILED DESCRIPTION

Figure 1:
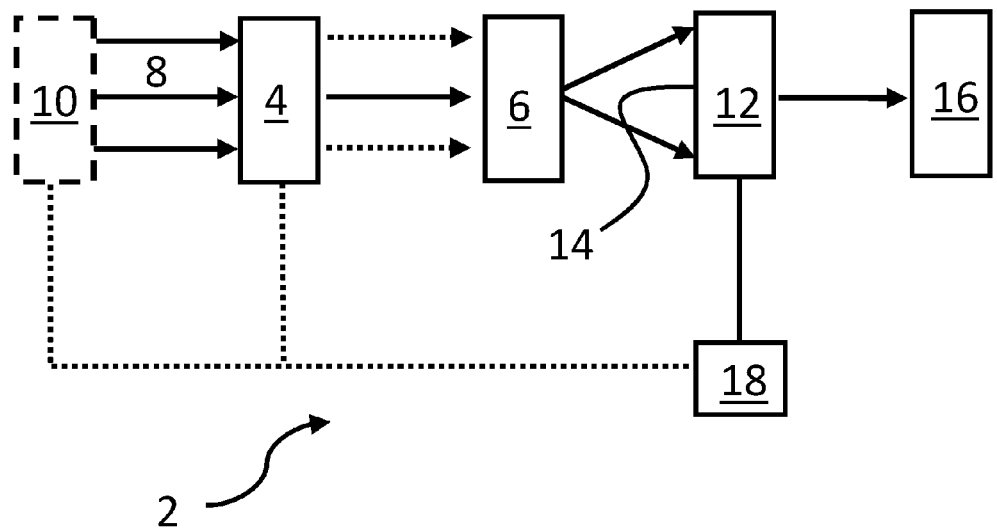
FIG. 1 illustrates a functional block diagram of an SLM spectrometer according to the present invention.

Referring now to FIG. 1, a spectrometer according to the present invention 2 comprises an input 4 having a plurality of entrance field stops by means of each of which a same dispersion element 6 may be illuminated by optical radiation 8. The optical radiation 8 is optionally generated by a source of optical radiation 10 or may emanate from a sample material under investigation, depending on the intended use of the spectrometer 2. The input 4 may, for example and without limitation, comprise a plurality of individual entrance apertures, a single movable entrance aperture or an LCD screen or other second SLM device, the elements of which are controllable to simulate physical entrance apertures, as will be described in more detail below.

The dispersion element 6, which may for example and without limitation be a prism, a transmission or a reflection diffraction grating, is provided to disperse by wavelength incident optical radiation which is passed to it via the entrance field stops of the input 4. A spatial light modulator (SLM) 12 is positioned to receive at least a portion of the dispersed optical radiation distributed by wavelength across an active surface 14. The SLM 12 is of known construction, being either a reflective or a transmissive device, with the active surface 14 comprising an array of individually controllable elements arranged in columns so that different columns of the array will receive a wavelength or narrow band of wavelengths that has been dispersed through a different angle by the dispersion element 6.

An output 16 which may be, for example and without limitation, an exit port an end of a fiber optic bundle, a detector, or other light collector, is provided to receive optical radiation which is directed to it by appropriate operation of the elements of the active surface 14 of the SLM 12. A controller 18 is configured in a known manner to control the operation of the SLM 12, and optionally the input 4 and the radiation source 10.

The spectrometer 2 has been described above in terms of functional block elements and it will be appreciated that any one or more of these elements can comprise one or more separate units operably connected to provide the described functionality. Additionally, it will also be appreciated that other optical components such as mirrors, focussing and/or collimating optics may be included in the spectrometer 2 but are not essential to the understanding of the present invention and so are omitted from the above general description of the spectrometer 2 according to the present invention.

Figure 2:
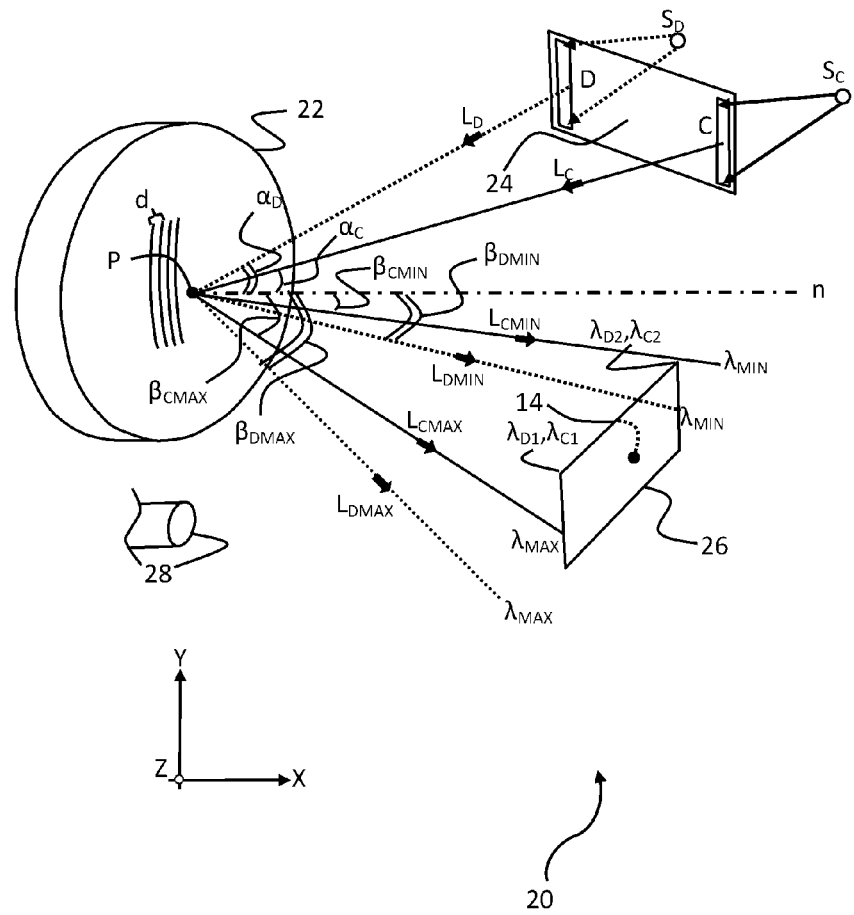
FIG. 2 illustrates a time-division multiplexed embodiment of the SLM spectrometer illustrated generally in FIG. 1.

Referring now to FIG. 2, an embodiment 20 of the spectrometer 2 of FIG. 1 according to the present invention is illustrated configured for a time-division multiplexed operation. A concave focussing reflective diffraction grating 22 of the flat field imaging type is in use illuminated via a multi-aperture input 24, which is formed of a plurality (two illustrated) of entrance field stops, here physical entrance slits C,D. The diffraction grating 22 generates an image of the slits C,D which is dispersed by wavelength component across an SLM in the form of a DMD 26, the active surface 14 (facing grating 22) of which comprises, as is well known in the art, an aerial array of mirrors that are co-operable to form the columns described above with reference to FIG. 1.

The DMD 26 is operable to selectively direct wavelength portions of the incident wavelength region to an optical fiber output 28. An optical radiation source 10 is provided which in the present embodiment comprises a plurality (two illustrated) of individually energisable optical sources $S_C, S_D$, each one of which is associated with a corresponding one of the plurality of entrance slits C,D and which, in one embodiment, may be configured to generate only optical radiation in a wavelength region corresponding substantially to that region dispersed across the DMD 26. In other embodiments the source 10 may comprise a single broadband source of radiation for illuminating all entrance field stops.

A controller (not shown but see element 18 of FIG. 1) is provided to selectively switch each source $S_C, S_D$, in turn as will be discussed in greater detail below.

It is the nature of a grating to disperse optical radiation by wavelength in a preferred plane. The angle of dispersion, $\beta$, for a given wavelength, $\lambda$, is proportional to its angle of incidence, $\alpha$, at the grating (angles measured with respect to the grating normal, n) according to the well known 'grating formula': $\sin(\alpha)+\sin(\beta)=r p \lambda/d$ (1) where r is the order number of dispersion and d is the groove spacing. This means that for any given wavelength the angle of dispersion, $\beta$, for a particular order, r, will depend on the angle of incidence, $\alpha$.

Figure 3:
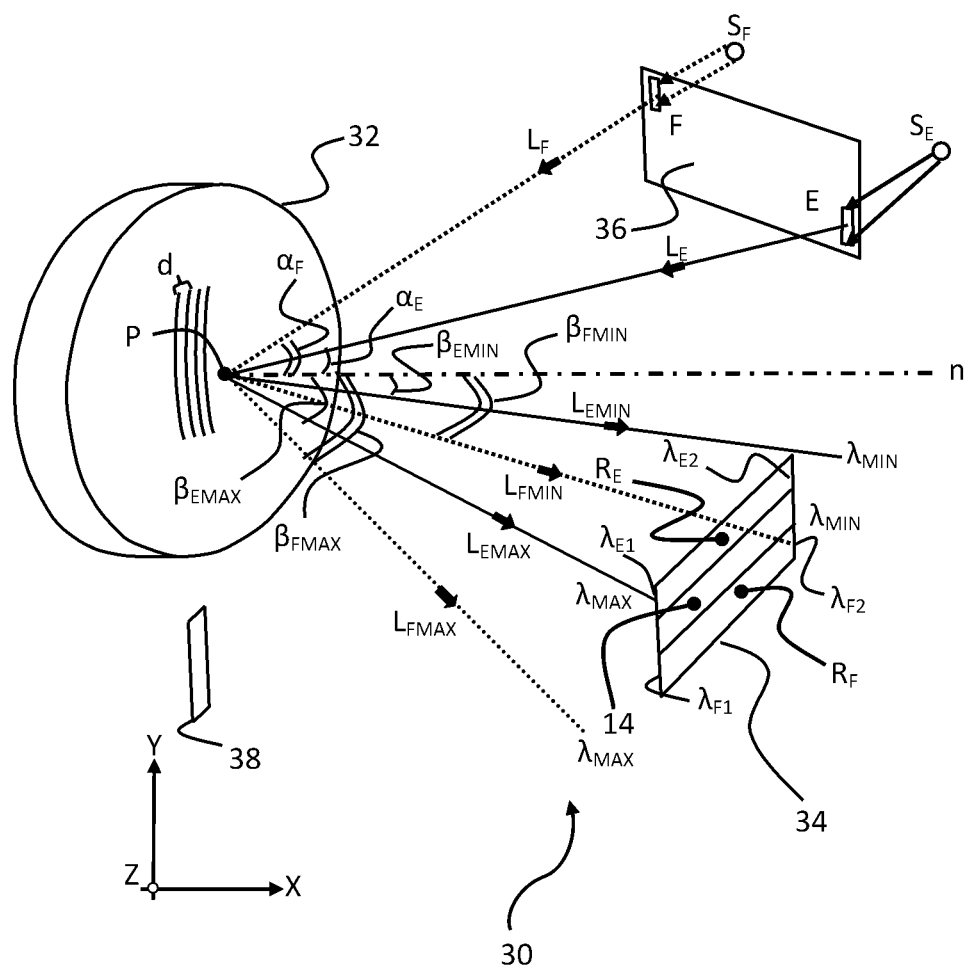
FIG. 3 illustrates a spatial-division multiplexed embodiment of the SLM spectrometer illustrated generally in FIG. 1.
Figure 4:
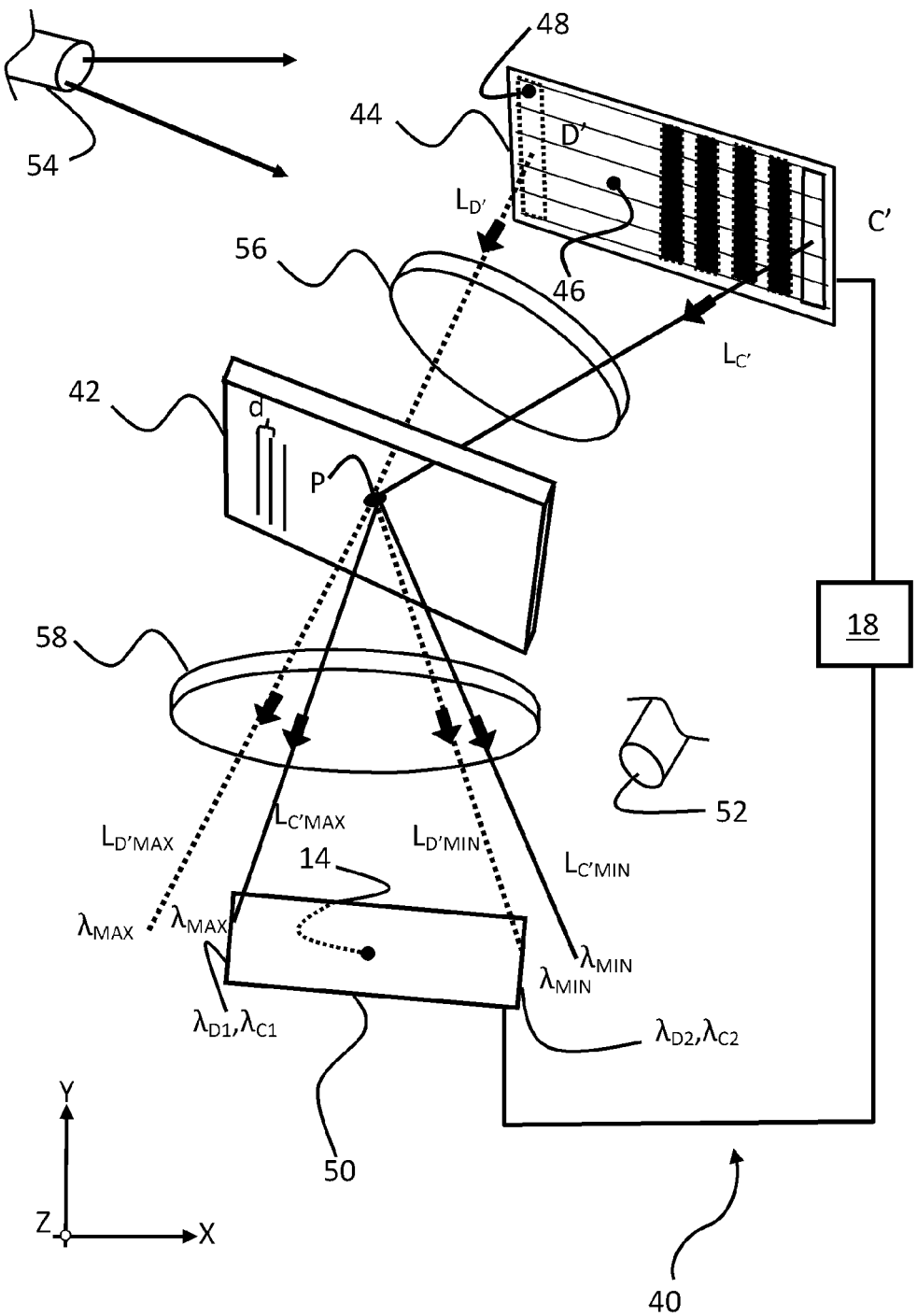
FIG. 4 illustrates a second time-division multiplexed embodiment of the SLM spectrometer illustrated generally in FIG. 1.

FIG. 2, FIG. 3 and FIG. 4 are drawn such that this preferred plane is the X-Y plane of the X-Y-Z coordinate system depicted in the Figures. The following description refers to angles and displacements in this preferred plane or projected onto this plane. To make this description clearer, first a line normal to the surface of the grating at the centre of the grating is defined to be the grating normal, n, lying in the preferred plane. Then, using the chosen grating normal, angles from the grating normal, n, are defined as rotation about the point, P, at the intersection of the grating normal and the grating surface.

Considering now the spectrometer 20 of FIG. 2 in greater detail, In the embodiment shown each of the optical radiation sources $S_C, S_D$, are adapted to generate optical radiation in a same wavelength band extending between a minimum wavelength $\lambda_{MIN}$ and a maximum wavelength $\lambda_{MAX}$. This entire wavelength band, in the present embodiment, constitutes a wavelength region of interest, $\Delta\lambda$, to be used in investigations employing the spectrometer 20.

Each source, $S_C$ say, is adapted to illuminate completely its associated entrance slit, C say. Usefully, each source $S_C, S_D$ may, for example, consist of a linear array of LED's extending along the length of the slit in a direction perpendicular to the preferred plane. Light from the associated entrance slit, C say, follows a light path, $L_C$, to be incident on the surface of the dispersion element, here the concave diffraction grating 22, at an angle of incidence, $\alpha_C$, to be diffracted in a wavelength dependent manner towards the DMD 26 and illuminate substantially all of an associated column. Light of the maximum wavelength, $\lambda_{MAX}$, will be dispersed through an angle $\beta_{CMAX}$, along light path $L_{CMAX}$, whereas light of the minimum wavelength, $\lambda_{MIN}$, will be dispersed through an angle $\beta_{CMIN}$, along light path $L_{CMIN}$. Similarly, light from the associated entrance slit, $S_D$, will follow a light path $L_D$ (illustrated by broken construction in FIG. 2), to be incident on the surface of the grating 22 at an angle of incidence, $\alpha_D$, which is different from the angle of incidence, $\alpha_C$, for light from slit C. Following from equation (1) it can be seen that for a same wavelength light from slit D will therefore be dispersed through a different angle β so that light of the maximum wavelength, $\lambda_{MAX}$, will be dispersed to traverse a light path $L_{DMAX}$, whereas light of the minimum wavelength, $\lambda_{MIN}$, will be dispersed to traverse a light path $L_{DMIN}$ (as illustrated by broken line construction in FIG. 2).

The DMD 26 is located in the preferred plane to receive at its active surface 14 a wavelength range, $\lambda_{C1}$-$\lambda_{C2}$, from within the total spectrum which is dispersed from light passing through the entrance slit C and a wavelength range, $\lambda_{D1}$-$\lambda_{D2}$, from within the total spectrum which is dispersed from the light passing through entrance slit D. Since the angles of incidence, $\alpha_C$, $\alpha_D$, of the light from the respective slits C,D are different then, as discussed above, the wavelength range associated with each slit C,D, which is incident at the DMD 26 will be different.

With the DMD 26 and the grating 22 in a fixed relative geometry the positions of the entrance slits C,D can be selected to provide angles of incidence such that (considering equation (1)) the wavelength ranges $\lambda_{C1}$-$\lambda_{C2}$ and $\lambda_{D1}$-$\lambda_{D2}$ combine to provide the wavelength region of interest, Δλ. In the present embodiment the arrangement of entrance slits C,D grating 22 and DMD 26 is such as to provide $\lambda_{D2}$=$\lambda_{MIN}$ and $\lambda_{C1}$=$\lambda_{MAX}$.

Usefully and in one configuration of the embodiment of the present invention according to FIG. 2 each source $S_C$,$S_D$ is designed to provide an output having only the wavelength components of the corresponding wavelength ranges which are to be received at the active surface of the DMD 26. Thus, for example, source $S_C$, produces only wavelengths in the range $\lambda_{C1}$-$\lambda_{C2}$. This can be achieved through an appropriate selection of LED's as the source $S_C$ and has an advantage that energy is not wasted in generating wavelengths which are unusable in the spectrometer 20 and which may cause unwanted background signals.

In the present embodiment of the spectrometer 20 of that 2 illustrated generally in FIG. 1 the controller 18 (not shown in FIG. 2) is adapted to switch each source $S_C$,$S_D$ separately and without overlap to illuminate the DMD 26 via the grating 22 through each entrance slit C,D separately to provide a time-division multiplexed signal at the DMD 26. The controller 18 then is further adapted to control the operation of the active surface 14 of the DMD 22 to scan the wavelength ranges $\lambda_{C1}$-$\lambda_{C2}$ and $\lambda_{D1}$-$\lambda_{D2}$ in turn over the fiber optic output 28 by, in this embodiment, controlling the mirror elements of the surface 14 column-wise across the rows of the DMD 22.

In an alternative configuration of the embodiment according to FIG. 2 the optical source 10 may be a single broadband source which in use is continuously energised and each entrance slit field stop C,D may be selectively shuttered so that the grating 22 is illuminated via only one entrance slit at a time.

In a further configuration of the embodiment according to FIG. 2 the controller 18 is adapted to operate the sources $S_C$, $S_D$ simultaneously with different operating frequencies to illuminate the DMD 26 via the grating 22 through each entrance slit C,D simultaneously to provide a frequency-division multiplexed signal at the DMD 26.

Referring now to FIG. 3, an embodiment 30 of the spectrometer 2 of FIG. 1 according to the present invention is illustrated configured for a spatial-division multiplexed operation. For ease of understanding the spectrometer 30 of FIG. 3 is illustrated as having generally the same geometrical arrangement of concave focussing reflection grating 32 and SLM in the form of a DMD 34 as that spectrometer 20 of FIG. 2.

Different from FIG. 2 is the configuration of the multi-aperture input 36. This input 36 is formed of a plurality (two illustrated) of entrance field stops, here physical entrance slits, E,F, say, which are displaced from one another not only in the preferred plane but also in a plane defining the length of the slit perpendicular to the preferred plane and each has a length less than is required for illumination of substantially all of a column of the active surface 14 of the DMD 34.

As with the entrance slits C,D of the embodiment of the spectrometer 20 of FIG. 2, the entrance slits E,F of the present embodiment each, when illuminated by associated sources $S_E$, $S_F$, provide associated light paths L E, $L_F$, which have different angles of incidence, $\alpha_E$, $\alpha_F$, at the grating 32. From a consideration of the foregoing description with regard to FIG. 2, it will be appreciated that this will result in different associated wavelength ranges $\lambda_{E1}$-$\lambda_{E2}$ and $\lambda_{F1}$-$\lambda_{F2}$ respectively being dispersed across the columns of the active surface 14 (not shown) of the DMD 34.

Different to the entrance slits C,D of the embodiment of the spectrometer 20 of FIG. 2, the entrance slits E,F of the present embodiment are displaced from one another so that light passing though an associated slit and diffracted through a same diffraction angle, β, will illuminate different, preferably non-overlapping, regions $R_E$,$R_F$, preferably individually controllable regions, of a same column of the DMD 34.

In the present embodiment of the spectrometer 30 of that 2 illustrated generally in FIG. 1 the controller 18 (not shown in FIG. 3) is adapted to energise each source $S_E$,$S_F$ simultaneously thereby illuminating the DMD 34 via the grating 32 through each entrance slit E,F simultaneously to provide a spatial-division multiplexed signal at the DMD 34. The controller 18 then is further adapted to control the operation of the active surface of the DMD 34 to scan the wavelength ranges $\lambda_{E1}$-$\lambda_{E2}$ and $\lambda_{F1}$-$\lambda_{F2}$ in turn over the exit aperture 38. It will be appreciated that the sources $S_E$, $S_F$, may be switched separately and without overlap to illuminate each column region of the DMD 34 in turn without departing from the invention as claimed.

Usefully in the present embodiment the light sources $S_E$, $S_F$ may comprise broad band lasers as SLED's.

Referring now to FIG. 4, an embodiment 40 of the spectrometer 2 of FIG. 1 is illustrated configured for a time-division multiplexed operation similar to that described with reference to the embodiment of FIG. 2. In the present embodiment 40 a transmission diffraction grating dispersion element 42 is disposed for illumination via a multi-field stop input in the form of a first DMD device 44. A second DMD 50 is positioned to receive across its active surface 14 (facing the dispersion element 42) optical radiation which has been dispersed by wavelength by the dispersion element 42 and is operable, here by means of controller 18, to selectively direct wavelength portions of the incident optical radiation to an output port, here in the form of an optical fiber 52. In this manner the entire wavelength region of the optical radiation incident on the second DMD 50 may be swept across the output port 52.

The first DMD device 44 is provided with an active surface 46 which comprises an aerial array of individually controllable micro-mirrors, illustrated by element 48. The controller 18 is here configured to control the operation of the individual micro-mirror elements 48 in a column-wise fashion to switch between a position in which the mirrors of a particular column all reflect light towards the diffraction element 42 and a position in which the same mirrors do not reflect light towards the diffraction element 42. In this manner the individual columns of micro-mirrors can be made to form a plurality entrance field stops C',D' which can emulate the physical entrance slits C,D of FIG. 2.

Optical radiation from a source, here a fiber optic 54 is made to illuminate the active surface 46 of the first DMD 44. An appropriately switched column, C' say, of micro-mirror elements directs the incident optical radiation to follow a light path $L_{C'}$, through a collimating lens 56 for example to be incident upon the transmission diffraction grating dispersion element 42. The dispersion element 42 acts to disperse the optical radiation being transmitted through it in a wavelength dependent manner towards the second DMD 50. Similar to the spectrometer 20 of FIG. 2, light of a maximum wavelength $\lambda_{MAX}$ will be dispersed to follow a light path $L_{C'MAX}$, through a focussing lens 58 for example, whereas light of a minimum wavelength $\lambda_{MIN}$ will be dispersed to follow a light path $L_{C'MIN}$. Similarly when appropriately switched the column D' of micro-mirrors will reflect the incident optical radiation from the fiber optic 54 to follow a light path $L_{D'}$, through a collimating lens 56 for example, to be incident upon the transmission diffraction grating dispersion element 42 at an angle of incidence that is different from that associated with light reflected by any other column (say column C'). As the angles of incidence of optical radiation reflected from the columns D' and C' are different then according to equation (1) their angles of dispersion will be different. Thus light of the maximum wavelength $\lambda_{MAX}$ will be dispersed to follow a light path $L_{D'MAX}$, through a focussing lens 58 for example, whereas light of the minimum wavelength $\lambda_{MIN}$ will be dispersed to follow a light path $L_{D'MAX}$.

As with the spectrometer 20 of FIG. 2, in the present embodiment of spectrometer 40 with the second DMD 50 and the grating 42 in a fixed relative geometry the position of the first DMD 44 and hence those of the entrance field stops C',D' can be selected to provide angles of incidence such that (considering equation (1)) the wavelength ranges $\lambda_{C'1}$-$\lambda_{C'2}$ and $\lambda_{D'1}$-$\lambda_{D'2}$ combine to provide the wavelength region of interest, $\Delta\lambda$. In the present embodiment the arrangement of first DMD 44, grating 42 and second DMD 50 is such as to provide $\lambda_{D'2}=\lambda_{MIN}$ and $\lambda_{C'1}=\lambda_{MAX}$.

In other embodiments using the first DMD 44 to provide the plurality of entrance field stops the controller 18 may be suitably adapted to switch different columns of micro-mirrors at different frequencies and/or switch different groups of micro-mirrors in different columns in order to simulate entrance apertures which are displaced from one another not only across the active surface 46 (i.e. different columns) but also which are displaced from one another in a direction perpendicular to the preferred plane (i.e. along a column). In this manner time, frequency and/or spatial division multiplexed operation may be provided by a single, versatile spectrometer.

The invention claimed is:

1. A spectrometer, comprising:
an input configured to receive optical radiation;
a dispersion element configured to disperse by wavelength the optical radiation passing from the input;
an output;
a spatial light modulator (SLM) configured to receive a wavelength region of the optical radiation dispersed by the dispersion element as a wavelength region of interest, and configured to selectively direct wavelength portions of the wavelength region of interest to the output; and
a controller;

wherein the input is configured to provide a plurality of entrance field stops by which the dispersion element is, in use, illuminated,
wherein each entrance field stop of the plurality of entrance field stops is configured to cooperate with the dispersion element to generate a different dispersed wavelength region on the SLM that together provide the wavelength region of interest larger than any of the different dispersed wavelength regions on the SLM,
wherein the controller is configured to control operation of at least the input to generate a time-division multiplexed signal at the SLM.

2. The spectrometer of claim 1, wherein,
each entrance field stop in the plurality of entrance field stops is associated with a different source of the optical radiation from a plurality of optical radiation sources,
each different source is configured to generate the optical radiation having a wavelength range substantially that of the dispersed wavelength region at the SLM, and
the controller is configured to control operation of at least one of the input and the plurality of optical radiation sources to generate the time-division multiplexed signal at the SLM.

3. The spectrometer of claim 2, wherein the controller is operatively connected to the plurality of optical radiation sources, and
wherein the controller is further configured to switch each optical radiation source of the plurality of optical radiation sources in sequence and without overlap to generate the time-division multiplexed signal at the SLM.

4. The spectrometer of claim 2, wherein the controller is configured to control operation of the plurality of optical radiation sources to generate a frequency-division multiplexed signal at the SLM.

5. The spectrometer of claim 4, wherein the controller is further configured to activate each optical radiation source of the plurality of optical radiation sources simultaneously and with different intensity modulation frequencies to generate the frequency-division multiplexed signal at the SLM.

6. The spectrometer of claim 1, wherein the plurality of entrance field stops and the dispersion element are configured to illuminate different regions of the SLM with the optical radiation, from an associated different field stop of the plurality of entrance field stops, diffracted through a same diffraction angle.

7. The spectrometer of claim 6, wherein the plurality of entrance field stops are displaced from each other to provide, at the dispersion element, a different angle of incidence for the optical radiation, and
wherein the plurality of entrance field stops are displaced from each other in a direction perpendicular to a preferred dispersion plane of the dispersion element.

8. The spectrometer of claim 6, wherein the controller is configured to activate a plurality of optical radiation sources simultaneously.

9. The spectrometer of claim 1, wherein the SLM is a digital micro-mirror device (DMD).

10. The spectrometer of claim 1, wherein the dispersion element is a concave focusing reflection grating.

11. The spectrometer of claim 1, wherein the dispersion element is a transmission diffraction grating.

12. The spectrometer of claim 1, wherein the input comprises a second SLM having an active surface controllable to define the plurality of entrance field stops.

13. The spectrometer of claim 1, wherein the input comprises digital micro-mirror device (DMD) having an active surface controllable to define the plurality of entrance field stops.

14. A spectrometer, comprising:
 an input configured to receive optical radiation via a plurality of entrance field stops;
 a dispersion element configured to disperse by wavelength the optical radiation from the input;
 an output;
 a first spatial light modulator (SLM) configured to receive a wavelength region of the optical radiation dispersed by wavelength as a wavelength region of interest, and configured to selectively direct wavelength portions of the received wavelength region of interest to the output; and
 a controller;
 wherein each entrance field stop of the plurality of entrance field stops of the input is configured to cooperate with the dispersion element to generate a different dispersed wavelength region on the SLM, and
 wherein the controller is configured to control operation of at least the input to generate a time-division multiplexed signal at the SLM.

15. The spectrometer of claim 14, wherein the first SLM is a digital micro-mirror device (DMD).

16. The spectrometer of claim 14, wherein the dispersion element comprises a reflective diffraction grating.

17. The spectrometer of claim 14, wherein the input comprises a second SLM having an active surface controllable to define the plurality of entrance field stops.

18. The spectrometer of claim 14, wherein the dispersion element comprises a transmission diffraction grating.

19. The spectrometer of claim 18, further comprising:
 a first lens; and
 a second lens;
 wherein the input comprises a second SLM having an active surface controllable to define the plurality of entrance field stops,
 wherein the optical radiation from the input to the dispersion element passes through the first lens, and
 wherein the wavelength region of the optical radiation dispersed by wavelength passes through the second lens.

* * * * *